United States Patent
Jiang et al.

(10) Patent No.: US 12,487,236 B2
(45) Date of Patent: Dec. 2, 2025

(54) POLYPEPTIDE MAGNETIC NANOPARTICLE, PREPARATION METHOD THEREFOR AND USE THEREOF

(71) Applicant: BEIJING NANOPEP BIOTECH CORPORATION, Beijing (CN)

(72) Inventors: Tao Jiang, Beijing (CN); Nannan Li, Beijing (CN); Jian Xue, Beijing (CN); Xuejiao Bai, Beijing (CN); Qian Yu, Beijing (CN); Da Li, Beijing (CN); Zhen Cai, Beijing (CN); Qian Cai, Beijing (CN); An Xu, Beijing (CN); Haiyan Qiu, Beijing (CN); Yu Han, Beijing (CN); Ran Wang, Beijing (CN)

(73) Assignee: BEIJING NANOPEP BIOTECH CORPORATION, LTD., Beijing (CN)

( * ) Notice: Subject to any disclaimer, the term of this patent is extended or adjusted under 35 U.S.C. 154(b) by 1052 days.

(21) Appl. No.: 17/611,657

(22) PCT Filed: May 19, 2020

(86) PCT No.: PCT/CN2020/091063
§ 371 (c)(1),
(2) Date: Nov. 16, 2021

(87) PCT Pub. No.: WO2020/233572
PCT Pub. Date: Nov. 26, 2020

(65) Prior Publication Data
US 2022/0196648 A1      Jun. 23, 2022

(30) Foreign Application Priority Data
May 21, 2019      (CN) .......................... 201910424124.5

(51) Int. Cl.
*G01N 33/68* (2006.01)
*G01N 33/531* (2006.01)
(Continued)

(52) U.S. Cl.
CPC ..... *G01N 33/54326* (2013.01); *G01N 33/531* (2013.01); *G01N 33/54346* (2013.01);
(Continued)

(58) Field of Classification Search
CPC ........... G01N 33/54326; G01N 33/531; G01N 33/54346; G01N 33/574; G01N 33/57492;
(Continued)

(56) References Cited

U.S. PATENT DOCUMENTS 10,329,353 B2    6/2019   Satelli et al.
2014/0065645 A1  3/2014   Han et al.

FOREIGN PATENT DOCUMENTS

CN    103923192     7/2014
CN    104535772     4/2015
(Continued)

OTHER PUBLICATIONS

Machine Translation of CN103923192 B, Translated by Patent Translate Espacenet.org on Feb. 26, 2025, 53 pages (Year: 2025).*
(Continued)

*Primary Examiner* — Bao-Thuy L Nguyen
*Assistant Examiner* — Michael Cameron Sveiven
(74) *Attorney, Agent, or Firm* — Ballard Spahr LLP

(57) ABSTRACT

Described is a polypeptide magnetic nanoparticle having a specific targeting polypeptide and a magnetic nanoparticle. The amino acid sequence of the specific targeting polypeptide is VRRDAPRFSMQGLDA-X, and the C-terminal X thereof is a sequence of 5 to 20 amino acids. The amino acid in the amino acid sequence of C-terminal X is selected from one or more of: C, G, and N. The polypeptide magnetic nanoparticle can be used for CTC detection and molecular typing of various cancer types, including esophageal cancer, liver cancer, lung cancer, stomach cancer, bladder cancer,
(Continued)

(A)

(B)

skin cancer, melanoma, breast cancer, colorectal cancer, cervical cancer, etc. Biomarkers of CTC molecular typing include PD-L1, HER2, ER, PR, AR, EGFR, VEGFR, CXCR4, etc. The polypeptide magnetic nanoparticle is helpful for CTC detection and the qualitative and semiquantitative analysis of expression levels of biomarkers at CTC level, thereby performing precise therapy such as targeted individualized targeted therapy or immunotherapy on patients.

8 Claims, 9 Drawing Sheets

Specification includes a Sequence Listing.

(51) Int. Cl.
| | |
|---|---|
| *G01N 33/543* | (2006.01) |
| *G01N 33/574* | (2006.01) |
| *B82Y 5/00* | (2011.01) |
| *B82Y 25/00* | (2011.01) |
| *B82Y 40/00* | (2011.01) |

(52) U.S. Cl.
CPC ........... *G01N 33/574* (2013.01); *G01N 33/68* (2013.01); *B82Y 5/00* (2013.01); *B82Y 25/00* (2013.01); *B82Y 40/00* (2013.01)

(58) Field of Classification Search
CPC ............... G01N 33/68; G01N 33/5434; G01N 33/57415; G01N 33/57423; G01N 33/6818; G01N 2333/70596; B82Y 5/00; B82Y 25/00; B82Y 40/00; C07K 14/00; A61P 35/00
See application file for complete search history.

(56) References Cited

FOREIGN PATENT DOCUMENTS

| | | |
|---|---|---|
| CN | 105209489 | 12/2015 |
| CN | 105440112 | 3/2016 |
| CN | 107261155 | 10/2017 |
| CN | 109467588 | 3/2019 |

OTHER PUBLICATIONS

International Search Report and Written Opinion mailed on Jul. 29, 2020 for Patent Application No. PCT/CN2020/091063 which was filed on May 19, 2020 and published as WO2020233572A1 on Nov. 26, 2020 (Applicant—Beijing Nanopep Biotech Corporation, Ltd.) (16 pages).

* cited by examiner

POLYPEPTIDE MAGNETIC NANOPARTICLE, PREPARATION METHOD THEREFOR AND USE THEREOF

CROSS REFERENCES TO RELATED APPLICATIONS

This application is a U.S. National Phase Application of International Application No. PCT/CN2020/091063, filed May 19, 2020, which claims priority to Chinese Application No. CN201910424124.5, filed on May 21, 2019, each of which are hereby incorporated by reference in their entirety.

REFERENCE TO SEQUENCE LISTING

The Sequence Listing submitted Nov. 16, 2021, as a text file named "38161_0001U1_sequence_listing.txt," created on Nov. 2, 2021, and having a size of 6,345 bytes is hereby incorporated by reference pursuant to 37 C.F.R. § 1.52(e)(5).

TECHNICAL FIELD

The invention belongs to the field of medical detection, and specifically relates to a polypeptide magnetic nanoparticle, preparation method therefor and use thereof.

BACKGROUND OF THE INVENTION

Cancer has become one of diseases that seriously endanger human health and life, and more than 8 million people die of cancer each year in the world. Conventional tumor detection methods in clinic are mostly imaging and tissue biopsy, which are limited by the resolution of imaging, and it is difficult to find tumors less than 5 mm. While tissue biopsy is difficult to achieve multiple sampling, and brings pain and risks to patients. Circulating tumor cells (CTC) shed from the primary tumor focus and enter the blood circulation, carry almost all the genetic and protein information of the tumor tissue in situ. CTC detection, as a form of liquid biopsy at present, can dynamically reflect the progress of the tumor, and provide basis for predicting the curative effect, evaluating the prognosis and monitoring the recurrence of tumor.

Tumors are highly heterogeneous. Even tumors with the same histology and morphology have different molecular biological changes. Different biological changes have different biological behaviors and sensitivity to treatment. At present, the traditional pathological classification, such as staging and grading, which is commonly used in clinic, has limited ability to predict tumors. In recent years, with the development of science and technology, targeted therapy and immunotherapy for tumors have attracted more and more attention. In order to achieve the maximum efficacy and minimum toxicity, molecular diagnosis and precise typing of tumor types are the key to treatment. Therefore, molecular typing of tumors is an inevitable requirement for individualized tumor treatment. Breast cancer can be taken as an example to illustrate the molecular diagnosis and precise typing of tumor-targeting drugs as well as the companion diagnostic of targeted drugs. Breast cancer is one of the common malignant tumors in women, and its incidence rate increases year by year, which seriously threatens physical and mental health of women. At present, more than 40 genes related to the occurrence and development of breast cancer have been found, the most important of which are human epidermal growth factor receptor 2 (HER2), ER (estrogen receptor), PR (progesterone receptor) and androgen receptor (AR), etc., and various targeted therapies and hormone therapies have been researched and developed. In 2002, the US Food and Drug Administration (FDA) approved the drug targeting HER2 positive breast cancer—the monoclonal antibody Herceptin for the treatment of breast cancer. Clinical efficacy shows that the drug can improve the treatment efficiency of patients and prolong the survival time of patients in pre-surgery and post-surgery adjuvant treatment of advanced breast cancer. Therefore, molecular typing of breast cancer is of great significance in tumor therapy, especially in targeted drug therapy. Since CTC in peripheral blood carries almost all of the genetic and protein information of in situ tumor tissue, molecular typing of CTC in peripheral blood of the detected patients such as HER2, ER, and PR is of great significance for guiding the clinical treatment of the patients. Similarly, for almost all other malignant tumors, molecular typing and companion diagnostic of targeted drugs have important clinical value.

In addition to targeted therapy for tumor, immunotherapy for tumor has also made a series of progress in recent years, which has changed the treatment pattern of many cancers. PD-1/PD-L1 antibody drug for immune checkpoints is currently the most anticipated and fastest-developing tumor immunotherapy, so the PD-L1 expression of tumor cells is crucial for the pre-evaluation of the immunotherapy effect. Therefore, the companion diagnostic of PD-L1 expression at the CTC level has important clinical guiding significance for the immunotherapy of PD-1/PD-L1 antibody drug.

SUMMARY OF THE INVENTION

Therefore, the invention aims to overcome the defects in the prior art and provides a polypeptide magnetic nanoparticles for detecting circulating tumor cells and molecular typing of tumor markers as well as the preparation method and use thereof.

Before explaining the present invention, the terms used herein are defined as follows:

The term "PBS" refer to: phosphate buffer solution.
The term "HEPES" refer to: 4-hydroxyethylpiperazine ethanesulfonic acid buffer.
The term "PD-L1" refer to: programmed death receptor ligand-1.
The term "HER2" refer to: human epidermal growth factor receptor 2.
The term "ER" refer to: estrogen receptor.
The term "PR" refer to: progesterone receptor.
The term "AR" refer to: androgen receptor.
The term "EGFR" refer to: epidermal growth factor receptor.
The term "CXCR4" refer to: chemokine receptor 4.
The term "VEGFR" refer to: vascular endothelial growth factor receptor.

In order to achieve the above purpose, the technical scheme of the present invention is as follows:

The first aspect of the present invention provides a polypeptide magnetic nanoparticle, and the polypeptide magnetic nanoparticle comprises: specific targeting polypeptide and magnetic nanoparticle; wherein the amino acid sequence of the specific targeting polypeptide is VRRDAPRFSMQGLDA-X (SEQ ID NO:10), and its C-terminal X is a sequence of 5-20, preferably 5-15, more preferably 9-12 amino acids, and X is not CGGNCC (SEQ ID NO:11), CGGNCN (SEQ ID NO:12), CGGNNC (SEQ ID NO:13), CGGNNN (SEQ ID NO:14), CGGNCCN (SEQ ID NO:15), CGGNCCNN (SEQ ID NO:16), CGGNCNN (SEQ ID NO:17), CGGNCNNN (SEQ ID NO:18), CGG- NNCN (SEQ ID NO:19), CGGNNCNN (SEQ ID NO:20), CGGNNNN (SEQ ID NO:21), CGGNNNNN (SEQ ID NO:22);

preferably, the amino acid in the X amino acid sequence is one or more selected from the following: C, G, N.

The polypeptide magnetic nanoparticle according to the first aspect of the present invention, wherein the polypeptide is a specific recognition polypeptide targeting epithelial cell adhesion molecules;

preferably, the amino acid sequence of the specific targeting polypeptide is SEQ ID NO: 1~9; most preferably, the amino acid sequence of the specific targeting polypeptide is SEQ ID NO: 1.

The polypeptide magnetic nanoparticle according to the first aspect, wherein the magnetic nanoparticle is magnetic nanoparticle with streptavidin; preferably, the particle size of the magnetic nanoparticle is 100 to 900 nm; more preferably, the particle size of the magnetic nanoparticle is 300 nm to 800 nm.

The second aspect of the present invention provides the preparation method of the polypeptide magnetic nanoparticles according to the first aspect, and the method includes the following steps:

(1) preparing polypeptide and magnetic nanoparticle solutions;

(2) mixing and reacting the polypeptide and the magnetic nanoparticle solutions prepared in step (1) to obtain the polypeptide magnetic nanoparticles.

According to the method of the second aspect of the present invention, wherein, in the step (1), the solvent for preparing the polypeptide solution is one or more selected from the following: water, physiological saline, PBS, HEPES; and/or the solvent for preparing the magnetic nanoparticle solution is one or more selected from the following: water, PBS, HEPES.

According to the method of the second aspect of the present invention, wherein, in the step (1), the final concentration of the polypeptide solution is 1-1000 μg/mL, preferably 100-500 μg/mL; and/or the final concentration of the magnetic nanoparticle solution is 1-10000 μg/mL, preferably 1000-5000 μg/mL.

According to the method of the second aspect of the present invention, wherein, in the step (2), the mass ratio of the polypeptide and the magnetic nanoparticles is 1:10-5:1, preferably 2:5.

The third aspect of the present invention provides a use of the polypeptide magnetic nanoparticles of the first aspect or the polypeptide magnetic nanoparticles prepared according to the preparation method of the second aspect in preparing drugs and/or medical products for diagnosing or treating cancer.

The fourth aspect of the present invention provides a method for diagnosing or treating cancer, the method comprising: administering to a subject in need thereof the polypeptide magnetic nanoparticles of the first aspect or the polypeptide magnetic nanoparticles prepared according to the preparation method of the second aspect.

According to the use of the third aspect or the method of the fourth aspect of the present invention, wherein the cancer is one or more selected from the following: esophageal cancer, liver cancer, lung cancer, gastric cancer, breast cancer, colorectal cancer, cervical cancer, thyroid cancer, prostate cancer, pancreatic cancer, renal cancer, bladder cancer, skin cancer, melanoma, etc.; preferably is breast cancer, esophageal cancer, gastric cancer, liver cancer, lung cancer, colorectal cancer, cervical cancer and/or prostate cancer.

The fifth aspect of the present invention provides an use of the polypeptide magnetic nanoparticles of the first aspect or the polypeptide magnetic nanoparticles prepared according to the preparation method of the second aspect in preparing drugs and/or medical products for circulating tumor cell detection and/or molecular typing.

The sixth aspect of the present invention provides a polypeptide magnetic nanoparticle for the diagnosis or treatment of cancer and/or a polypeptide magnetic nanoparticle for circulating tumor cell detection and/or molecular typing, said polypeptide magnetic nanoparticle comprises the polypeptide magnetic nanoparticles of the first aspect or the polypeptide magnetic nanoparticles prepared according to the preparation method of the second aspect.

The seventh aspect of the present invention provides a method for detecting and/or molecular typing of circulating tumor cells, the method comprising: administering to a subject in need thereof the polypeptide magnetic nanoparticles of the first aspect or the polypeptide magnetic nanoparticles prepared according to the preparation method of the second aspect.

According to the use of the fifth aspect or the polypeptide magnetic nanoparticle of the sixth aspect or the method of the seventh aspect of the present invention, wherein the biomarker for circulating tumor cell detection and/or molecular typing is one or more selected from the following: PD-L1, HER2, ER, PR, AR, EGFR, CXCR4, VEGFR, etc.

The present invention provides a polypeptide magnetic nanoparticle for CTC detection, comprising:

1) A specific recognition polypeptide targeting epithelial cell adhesion molecule (EpCAM), with the corresponding preferred sequence is VRRDAPRFSMQGLDACGG-NNCNNNNN (SEQ ID NO:2) and its possible mutants.

2) The magnetic nanoparticles with streptavidin having a particle size of 100-900 nm, preferably, the particle size is 300-800 nm.) combining the above 1) and 2).

The method includes the following steps:

a) Dissolve the peptide powder in a certain amount of solvent to obtain a peptide solution with a concentration of 1-1000 μg/mL;

preferably, the solvent is selected from the good solvent for polypeptide, which is water, physiological saline, PBS, HEPES.

b) Dilute the magnetic nanoparticles with a certain amount of solvent to obtain a magnetic nanoparticle solution with a concentration of 1-10000 μg/mL;

Preferably, the solvent is magnetic bead dispersant, which is water, PBS, HEPES.

c) Mix the polypeptide solution and the magnetic nanoparticle solution according to a certain proportion, place the mixture on a shaking table react for 0.5-2 h at the temperature of 25-37° C. and the rotating speed of 100-160 rpm, and centrifuge and wash the obtained polypeptide magnetic nanoparticle assembly, preferably, the centrifugal rotating speed is 5000-10000 rpm, and the obtained polypeptide magnetic nanoparticle suspension is stored at 4° C.

The invention also provides the detection of CTC by the polypeptide nano detection device.

Preferably, the CTC is SK-BR-3, MCF-7, MDA-MB-231, H1975, H1650 and A549 tumor cells.

The present invention also provides the polypeptide nano detection device for detecting CTCs in peripheral blood of tumor patients and performing molecular typing of tumor markers on the detected CTC. Preferably, it is suitable for the detection and molecular typing of CTC in the peripheral blood of cancer patients such as breast cancer, esophageal cancer, gastric cancer, liver cancer, lung cancer, colorectal cancer, cervical cancer and prostate cancer. The steps of detecting CTC by polypeptide nanotechnology include incubation, washing, centrifugation, fixation, sealing, immunofluorescence staining, CTC identification and so on.

The invention also provides molecular typing related to the detected CTC. The identification of CTC-related molecular typing includes statistical analysis of the fluorescence intensity of CTC-related molecules, and the definition of expression intensity according to a certain threshold. Molecular typing includes positive expression and negative expression, wherein positive expression includes high, medium and low expression.

The biomarkers of CTC molecular typing include many biomarkers of solid tumor cells such as PD-L1, HER2, ER, PR, AR, EGFR, CXCR4, VEGFR and so on.

Polypeptide nano magnetic bead technology can be used for almost all solid tumors except brain tumors, osteosarcoma, and lymphoma, including esophageal cancer, liver cancer, lung cancer, stomach cancer, breast cancer, colorectal cancer, cervical cancer, thyroid cancer, prostate cancer, pancreatic cancer, renal cancer, bladder cancer, skin cancer, melanoma, etc.

One object of the present invention is to provide a polypeptide magnetic nanoparticle for circulating tumor cell detection and tumor marker molecular typing and its use. This method can realize in vitro diagnosis and molecular typing of breast cancer. The method is simple and convenient to operate, low in cost, rapid in detection process, and non-invasive in nature, which avoids the pain caused by conventional pathological detection to patients. In addition, this method is expected to track the condition in real time and adjust the treatment plan in time according to the development of the condition, which provides guidance for the realization of personalized medicine.

The present invention discloses the use of HER2, ER, PR, AR, EGFR, VEGFR, PD-L1 and other proteins of circulating tumor cells as cancer diagnosis and molecular typing markers. The present invention uses an inverted fluorescence microscope to detect the expression of protein markers as a use for molecular typing of tumor patients. The experiment of the present invention confirmed the feasibility of the method for diagnosis and molecular typing in the detection of clinical blood samples.

According to a specific embodiment of the present invention, in the use of the present invention, the tumor includes one or more of breast cancer, liver cancer, lung cancer, gastric cancer, esophageal cancer, colorectal cancer, prostate cancer and cervical cancer.

The polypeptide magnetic nanoparticles for detection and molecular typing of circulating tumor cells of the present invention may have, but are not limited to, the following beneficial effects:

1. The polypeptide nanotechnology of the present invention has high sensitivity and specificity for detecting CTC, which can detect CTC in the peripheral blood of patients with various clinical tumors, including breast cancer, liver cancer, lung cancer, gastric cancer, esophageal cancer, colorectal cancer, prostate cancer, cervical cancer and other tumors.

2. The present invention relates to a method for molecular typing of tumor related markers for detected CTC. Using the expression of target protein markers in circulating tumor cells for in vitro diagnosis and molecular typing of subjects, this method is expected to realize early disease screening and real-time tracking of diseases, which provides a new method for assisting tumor detection and tracking treatment effects. At the same time, it can also become an important means of prognostic evaluation, which provides guidance for the realization of personalized medicine, and has a good use prospect in improving the quality of life and prolonging the survival time of the patients.

BRIEF DESCRIPTION OF THE DRAWINGS

Hereinafter, the embodiments of the present invention will be described in detail with reference to the drawings, in which:

FIG. 1 shows the results of NO:1 polypeptide nanomagnetic beads of test example 1 enriching breast cancer cells and performing HER2 molecular typing, wherein FIG. 1A shows the capture of breast cancer cells SK-BR-3, MCF-7, and MDA-MB-231 by SEQ ID NO:1 polypeptide nanomagnetic beads of test example 1. FIG. 1B shows typical breast cancer cells with different HER2 expression levels detected by the SEQ ID NO:1 polypeptide nanomagnetic beads of test example 1.

FIG. 2 shows the results of SEQ NO:1 polypeptide nanomagnetic beads of test example 2 enriching lung cancer cells and performing PD-L1 molecular typing, wherein FIG. 2A shows the capture of lung cancer cells H1975, H1650 and A549 by SEQ ID NO:1 polypeptide nanomagnetic beads of test example 2. FIG. 2B shows typical lung cancer cells with different PD-L1 expression levels detected by the SEQ ID NO:1 polypeptide nanomagnetic beads of test example 2.

BEST MODE FOR CARRYING OUT THE INVENTION

Figure 1:
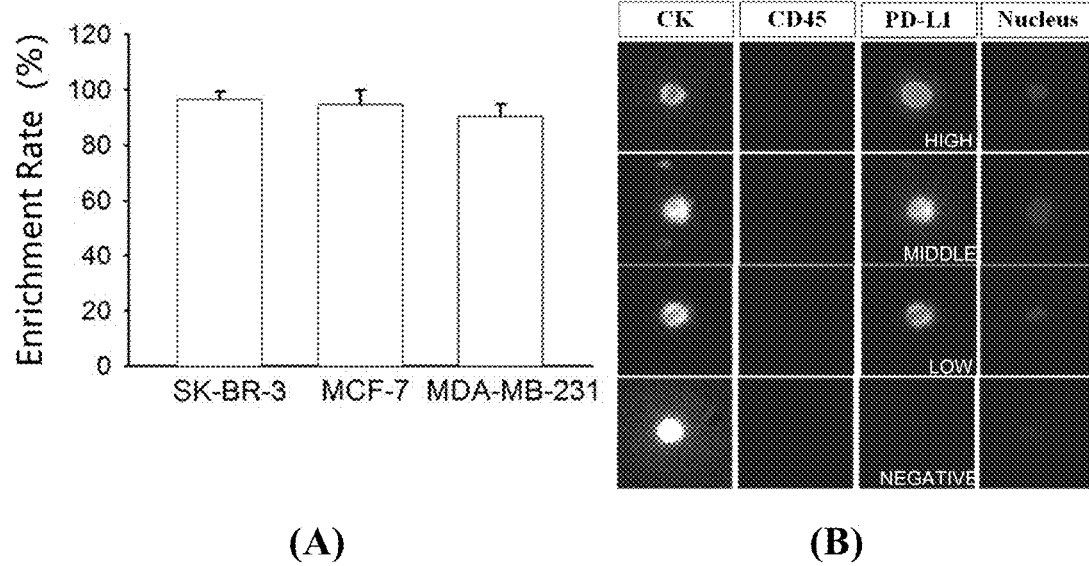

The present invention will be further illustrated by specific examples below, but it should be understood that these examples are only used for more detailed and specific description and should not be understood as limiting the present invention in any form. If the specific technology or condition is not indicated in the embodiment, it shall be performed according to the technology or condition described in the literature in the art or according to the product specification. The reagents or instruments that do not indicate the manufacturer are all conventional products that are commercially available from regular channels.

This section gives a general description of the materials and test methods used in the test of the present invention. Although many materials and operating methods used to achieve the purpose of the present invention are well known in the art, the present invention is still described herein as much detail as possible. It is clear to the person skilled in the art that, in the context, unless otherwise specified, the materials and operating methods used in the present invention are well known in the art.

Unless otherwise specified, the human tumor cell lines SK-BR-3, MCF-7, MDA-MB-231, H1975, H1650, and A549 used in the following examples were all purchased from the cell bank of the Institute of Basic Research, Chinese Academy of Medical Sciences.

Unless otherwise specified, the polypeptides used in the following examples have a purity of 98% or more.

Unless otherwise specified, the solvents of the aqueous solutions used in the following examples are all sterile ultrapure aqueous solutions with a resistivity of 18.2 MΩ·cm.

Unless otherwise specified, the reagents used in the following examples are all analytical reagents.

Unless otherwise specified, the scanning microscopes used in the following examples are all Olympus microscope IX73.

The reagents and instruments used in the following examples are as follows:

Reagents:

Magnetic beads, purchased from Thermo Fisher.

The peptide was synthesized by Beijing Zhongkenatai Biotechnology Co., Ltd., with a purity of 98%.

PBS, paraformaldehyde, complete medium, DAPI working solution, immunofluorescence staining blocking solution, all purchased from Hyclone.

Instruments:

The magnetic stand is made by Beijing Zhongkenatai Biotechnology Co., Ltd., which can hold 15 ml centrifuge tube.

Fluorescence microscope:

Olympus IX73, purchased from Beijing Cold Spring Technology Co., Ltd.

ZEISS Axio Vert A1 and ZEISS Z2, purchased from ZEISS Far East Co., Ltd.

Thermo Fisher CXS, purchased from Thermo Fisher.

Nikon Ti-S, purchased from Beijing Hengsanjiang Instrument Sales Co., Ltd.

ZEISS Z2 is recommended firstly, followed by Olympus IX73 and Thermo Fisher CX5.

EXAMPLE 1

Preparation of Polypeptide Magnetic Nanoparticle Assembly

1) Took 400 μL of 500 nm magnetic beads into a 2 mL Ep tube, added 1 ml PBS to wash, then placed the tube on a magnetic stand to enrich the beads for 10 minutes, and discarded the supernatant.

2) Added 2 mL PBS to wash, then placed the tube on a magnetic stand to enrich the beads for 10 minutes, and discarded the supernatant.

3) Added 1 mL PBS to dissolve the peptide powder, shook and voluted, added the peptide solution into the Ep tube containing the magnetic beads, vortexed for 1 minute with a vortex meter, placed the peptide magnetic bead mixture on a decolorizing shaker, and adjusted the rotating speed to 60 rpm, and incubated for 1 hour at room temperature.

4) Placed the Ep tube on the magnetic stand to enrich the peptide beads for 10 minutes, and discarded the supernatant. Add 1.5 mL PBS and wash for 3 times.

5) Added 400 μL PBS, vortexed for 1 minute, and stored the prepared polypeptide magnetic beads in a refrigerator at 4° C.

In the following test examples, the polypeptide magnetic nanoparticle assembly of SEQ ID NO:1-9 were adopted in test examples 1-2, and the polypeptide magnetic nanoparticle assembly of SEQ ID NO:1 was adopted in test examples 3-17.

EXPERIMENTAL EXAMPLE 1

Polypeptide Magnetic Nanoparticles Enrich Breast Cancer Cells and Perform HER2 Molecular Typing Collected SK-BR-3, MCF-7 and MDA-MB-231 cells in logarithmic growth phase, resuspended the cells in their respective complete medium (containing 10% fetal bovine serum, 100 U/mL penicillin, 100 μg/mL streptomycin), counted the cell concentration, added about 1000 cells of each cell to 2 mL of healthy human blood, added 10 μL of peptide nanomagnetic beads to mix, and incubated for 1 hour on a shaker at room temperature. Removed the centrifuge tube and add 5 mL PBS and mix gently, put it on the magnetic stand, and then placed the magnetic stand on a horizontal shaker for enrichment for 30 min. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing; added DAPI working solution dropwise to stain the nucleus, and then added 5 mL PBS for centrifugal washing after nuclear staining. Added 200 μL immunofluorescence staining blocking solution, blocked for 30 minutes at room temperature, and added 5 mL PBS for centrifugal washing. The enriched cells were stained with FITC-CK, PE-CD45 and Alexa Fluor647-HER2 (Abcam) antibodies for 1 hour respectively. Added 5 mL PBS for centrifugal washing the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and HER2 fluorescence intensity analysis on the detected cells. In which DAPI+/CK+/CD45− and cells conforming to the cell morphology were referred to as CTC and DAPI+/CK+/HER2+/CD45− cells were referred to as HER2 expressing CTC, and the HER2 expression of CTC was interpreted according to the fluorescence intensity of the HER2 channel. As shown in FIG. 1A, the capture rates of SK-BR-3, MCF-7 and MDA-MB-231 by SEQ ID NO:1 polypeptide nanomagnetic beads are stable and all reach over 90%, indicating that the polypeptide nanomagnetic beads have very high enrichment and detection efficiency for breast cancer cells. FIG. 1B shows breast cancer cells with different HER2 expression levels enriched by SEQ ID NO:1 polypeptide nanomagnetic beads. Table 1 shows the detection rates of SEQ ID NO:1-9 for SK-BR-3, MCF-7 and MDA-MB-231 three types of breast cancer cells.

TABLE 1

Detection rate for SK-BR-3, MCF-7 and MDA-MB-231 three types of breast cancer cells

| | Detection Rate (%) | | |
|---|---|---|---|
| Polypeptide | SK-BR-3 | MCF-7 | MDA-MB-231 |
| SEQ ID NO: 1 | 97 ± 3 | 91 ± 5 | 90 ± 5 |
| SEQ ID NO: 2 | 80 ± 9 | 61 ± 8 | 56 ± 12 |
| SEQ ID NO: 3 | 76 ± 13 | 68 ± 7 | 49 ± 8 |
| SEQ ID NO: 4 | 61 ± 14 | 70 ± 11 | 58 ± 4 |
| SEQ ID NO: 5 | 63 ± 7 | 78 ± 6 | 54 ± 7 |
| SEQ ID NO: 6 | 70 ± 5 | 51 ± 9 | 48 ± 7 |
| SEQ ID NO: 7 | 54 ± 10 | 49 ± 8 | 35 ± 14 |
| SEQ ID NO: 8 | 60 ± 7 | 47 ± 6 | 39 ± 11 |
| SEQ ID NO: 9 | 49 ± 14 | 50 ± 8 | 53 ± 13 |

EXPERIMENTAL EXAMPLE 2

Figure 2:
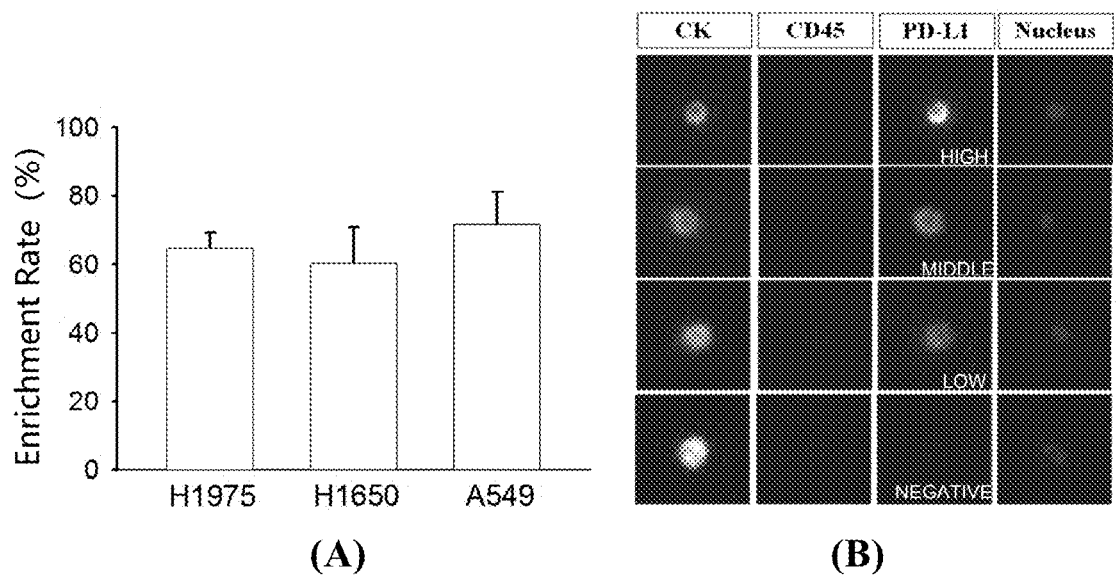

Polypeptide Magnetic Nanoparticles Enrich Lung Cancer Cells and Perform PD-L1 Molecular Typing Collected H1975, H1650 and A549 lung cancer cells in logarithmic growth phase, resuspended the cells in their respective complete medium (containing 10% fetal bovine serum, 100 U/mL penicillin, 100 μg/mL streptomycin), counted the cell concentration, added about 1000 cells of each cell to 2 mL of healthy human blood, added 10 μL of peptide nanomagnetic beads to mix, and incubated for 1 hour on a shaker at room temperature. Removed the centrifuge tube and add 5 mL PBS and mix gently, put it on the magnetic stand, and then placed the magnetic stand on a horizontal shaker for enrichment for 30 min. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing; added DAPI working solution dropwise to stain the nucleus, and then added 5 mL PBS for centrifugal washing after nuclear staining. Added 200 μL immunofluorescence staining blocking solution, blocked for 30 minutes at room temperature, and added 5 mL PBS for centrifugal washing. The enriched cells were stained with FITC-CK, PE-CD45 and Alexa Fluor647-PD-L1 (Abcam) antibodies for 1 hour respectively. Added 5 mL PBS for centrifugal washing the mount, observed under 20 times objective lens, set the corresponding exposure time of each fluorescence channel of DAPI, FITC, PE and Alexa Fluor 647, performed fluorescence scanning and fluorescence intensity analysis on the sample area. In which DAPI+/CK+/CD45− and cells conforming to the cell morphology were referred to as CTC and DAPI+/CK+/PD-L1+/CD45− cells were referred to as PD-L1 expressing CTC, and the PD-L1 expression of CTC was interpreted according to the fluorescence intensity of the PD-L1 channel. As shown in FIG. 2A, the polypeptide nanomagnetic beads have a capture rate of over 60% for H1975, H1650 and A549, indicating that the polypeptide nanomagnetic beads have very high enrichment and detection efficiency for breast cancer cells. FIG. 2B shows lung cancer cells with different PD-L1 expression levels enriched by SEQ ID NO:1 polypeptide nanomagnetic beads. Table 2 shows the detection rates of SEQ ID NO:1-9 for H1975, H1650 and A549 lung cancer cells.

TABLE 2

Detection rate for H1975, H1650 and A549 lung cancer cells

| | Detection Rate (%) | | |
|---|---|---|---|
| Polypeptide | H1975 | H1650 | A549 |
| SEQ ID NO: 1 | 65 ± 5 | 60 ± 6 | 72 ± 7 |
| SEQ ID NO: 2 | 58 ± 9 | 49 ± 5 | 39 ± 9 |
| SEQ ID NO: 3 | 48 ± 7 | 52 ± 4 | 40 ± 7 |
| SEQ ID NO: 4 | 38 ± 5 | 41 ± 6 | 53 ± 8 |
| SEQ ID NO: 5 | 49 ± 15 | 37 ± 8 | 42 ± 5 |
| SEQ ID NO: 6 | 55 ± 11 | 48 ± 13 | 47 ± 6 |
| SEQ ID NO: 7 | 39 ± 4 | 46 ± 8 | 38 ± 7 |
| SEQ ID NO: 8 | 45 ± 14 | 36 ± 7 | 49 ± 15 |
| SEQ ID NO: 9 | 42 ± 7 | 33 ± 11 | 46 ± 13 |

EXPERIMENTAL EXAMPLE 3

Figure 3:
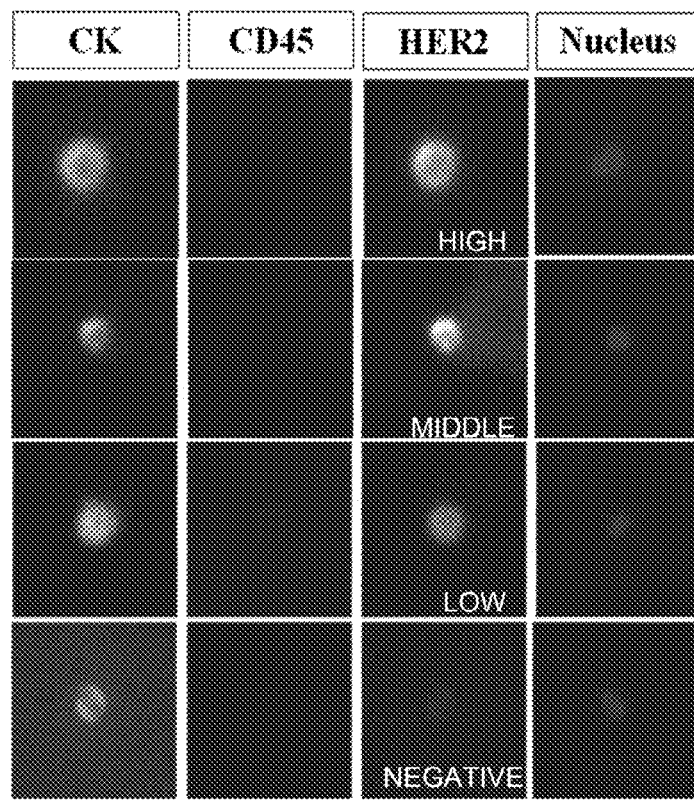
FIG. 3 shows the typical CTCs in the peripheral blood of breast cancer patients with different HER2 expression levels detected in test example 3.

Polypeptide Magnetic Nanoparticles Detect CTC in Peripheral Blood of Breast Cancer Patients and Perform HER2 Molecular Typing Took 2 mL of breast cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-HER2 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and HER2 fluorescence intensity analysis on the detected cells. In which DAPI+/CK+/CD45− and cells conforming to the cell morphology were referred to as CTCs, and DAPI+/CK+/HER2+/CD45− cells were referred to as HER2 expressing CTCs, and the HER2 expression level of CTCs was interpreted according to the fluorescence intensity of the HER2 channel. FIG. 3 shows the detected typical CTCs in the peripheral blood of breast cancer patients with different expression levels of HER2.

EXPERIMENTAL EXAMPLE 4

Figure 4:
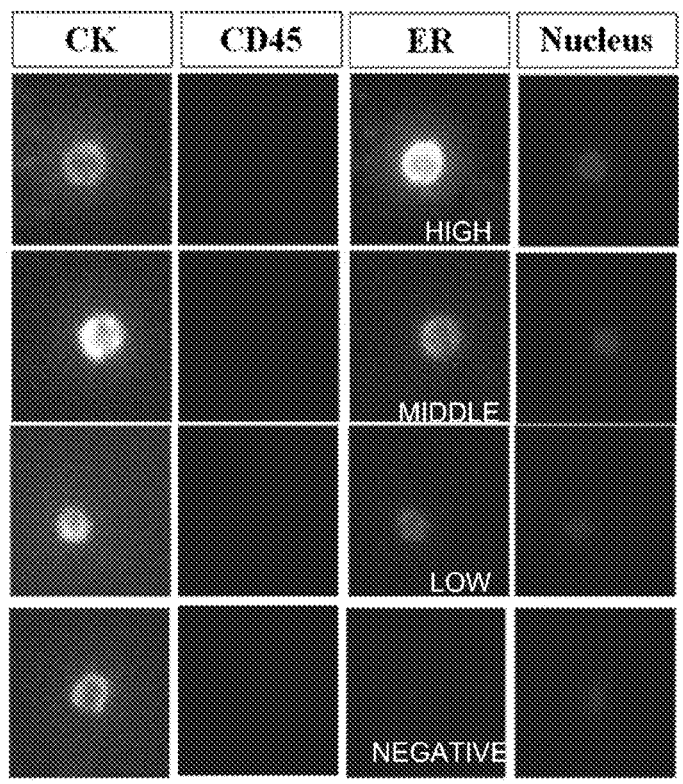
FIG. 4 shows typical CTCs in the peripheral blood of breast cancer patients with different ER expression levels detected in test example 4.

Polypeptide Magnetic Nanoparticles Detect CTC in Peripheral Blood of Breast Cancer Patients and Perform ER Molecular Typing Took 2 mL of breast cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-ER (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and ER fluorescence intensity analysis on the detected cells. In which DAPI+/CK+/CD45− and cells conforming to the cell morphology were referred to as CTCs, and DAPI+/CK+/ER+/CD45− cells were referred to as ER expressing CTCs, and the ER expression level of CTCs was interpreted according to the fluorescence intensity of the ER channel. FIG. 4 shows the detected typical CTCs in the peripheral blood of breast cancer patients with different expression levels of ER.

EXPERIMENTAL EXAMPLE 5

Figure 5:
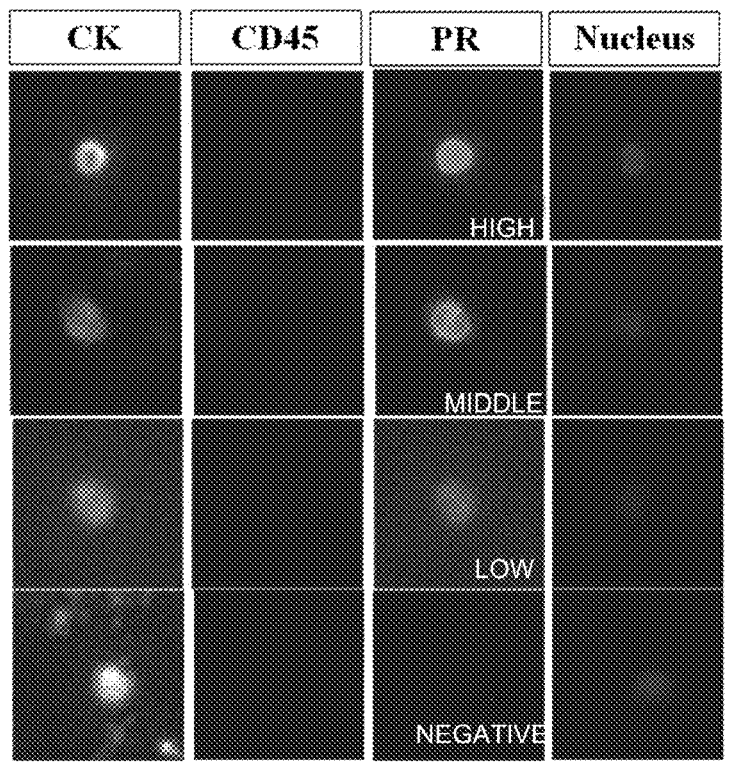
FIG. 5 shows the CTCs in the peripheral blood of breast cancer patients with different expression levels of typical PR molecules detected in test example 5.

Polypeptide Magnetic Nanoparticles Detect CTC in Peripheral Blood of Breast Cancer Patients and Perform PR Molecular Typing Took 2 mL of breast cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PR (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PR fluorescence intensity analysis on the detected cells. In which DAPI+/CK+/CD45− and cells conforming to the cell morphology were referred to as CTCs, and DAPI+/CK+/PR+/CD45− cells were referred to as PR expressing CTCs, and the PR expression level of CTCs was interpreted according to the fluorescence intensity of the PR channel. FIG. 5 shows the detected typical CTCs in the peripheral blood of breast cancer patients with different expression levels of PR.

EXPERIMENTAL EXAMPLE 6

Figure 6:
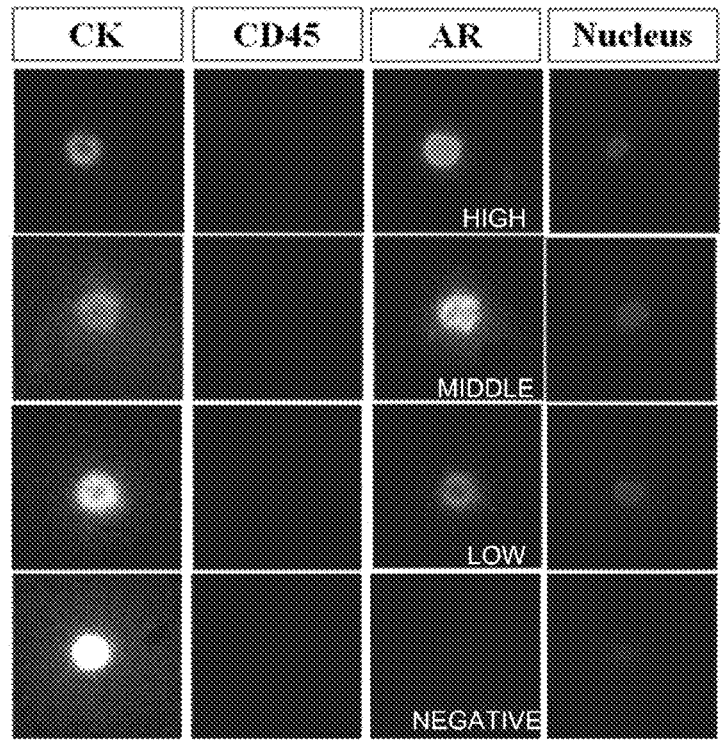
FIG. 6 shows the CTCs in the peripheral blood of breast cancer patients with different expression levels of typical AR molecules detected in test example 6.

Polypeptide Magnetic Nanoparticles Detect CTC in Peripheral Blood of Breast Cancer Patients and Perform AR Molecular Typing Took 2 mL of breast cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-AR (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and AR fluorescence intensity analysis on the detected cells. In which DAPI+/CK+/CD45− and cells conforming to the cell morphology were referred to as CTCs, and DAPI+CK+/AR+/CD45− cells were referred to as AR expressing CTCs, and the AR expression level of CTCs was interpreted according to the fluorescence intensity of the AR channel. FIG. 6 shows the detected typical CTCs in the peripheral blood of breast cancer patients with different expression levels of AR.

EXPERIMENTAL EXAMPLE 7

Figure 7:
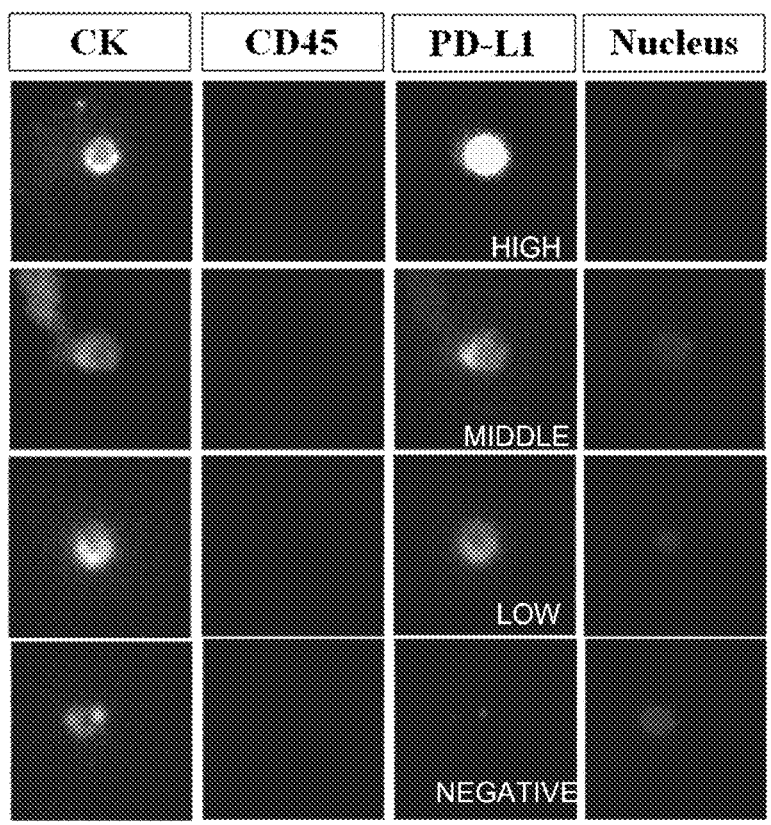
FIG. 7 shows the CTCs in the peripheral blood of esophageal cancer patients with different expression levels of typical PD-L1 molecules detected in test example 7.

Polypeptide Magnetic Nanoparticles Detect CTC in Peripheral Blood of Esophageal Cancer Patients and Perform PD-L1 Molecular Typing Took 2 mL of esophageal cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 7 shows the detected typical CTCs in the peripheral blood of esophageal cancer patients with different expression levels of PD-L1.

EXPERIMENTAL EXAMPLE 8

Figure 8:
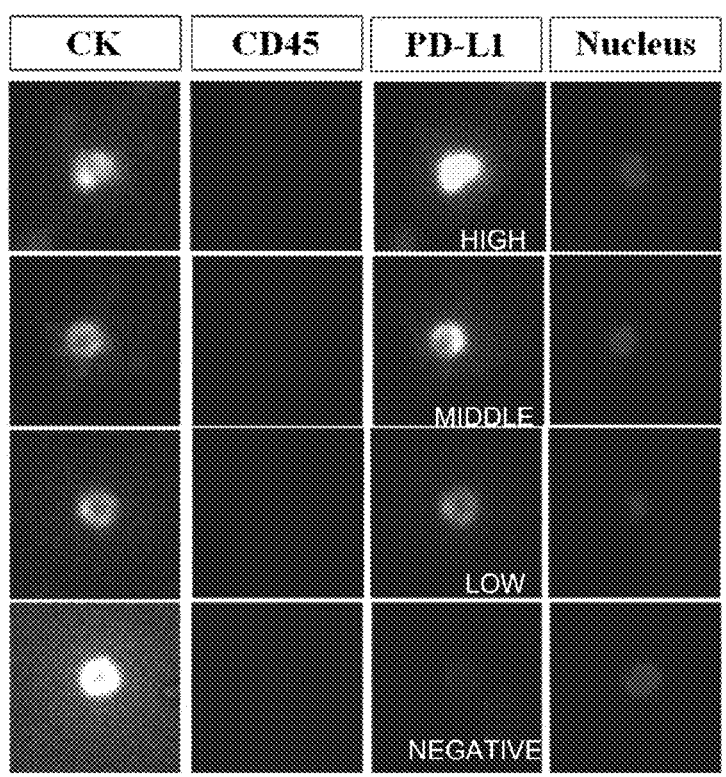
FIG. 8 shows the CTCs in the peripheral blood of lung cancer patients with different expression levels of typical PD-L1 molecules detected in test example 8.

Polypeptide Magnetic Nanoparticles Detect CTC in Peripheral Blood of Lung Cancer Patients and Perform PD-L1 Molecular Typing Took 2 mL of lung cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 8 shows the detected typical CTCs in the peripheral blood of lung cancer patients with different expression levels of PD-L1.

EXPERIMENTAL EXAMPLE 9

Figure 9:
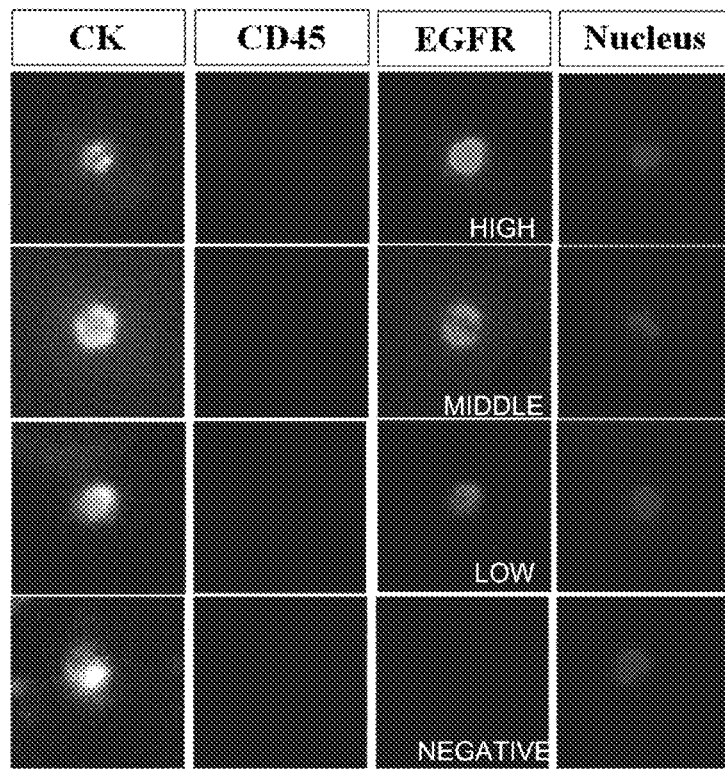
FIG. 9 shows the CTCs in the peripheral blood of lung cancer patients with different expression levels of typical EGFR molecules detected in test example 9.

Polypeptide Magnetic Nanoparticles Detect CTC in Peripheral Blood of Lung Cancer Patients and Perform EGFR Molecular Typing Took 2 mL of lung cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-EGFR (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and EGFR fluorescence intensity analysis on the detected cells. In which DAPI+/CK+/CD45− and cells conforming to the cell morphology were referred to as CTCs, and DAPI+/CK+/EGFR+/CD45− cells were referred to as EGFR expressing CTCs, and the EGFR expression level of CTCs was interpreted according to the fluorescence intensity of the EGFR channel. FIG. 9 shows the detected typical CTCs in the peripheral blood of lung cancer patients with different expression levels of EGFR.

EXPERIMENTAL EXAMPLE 10

Figure 10:
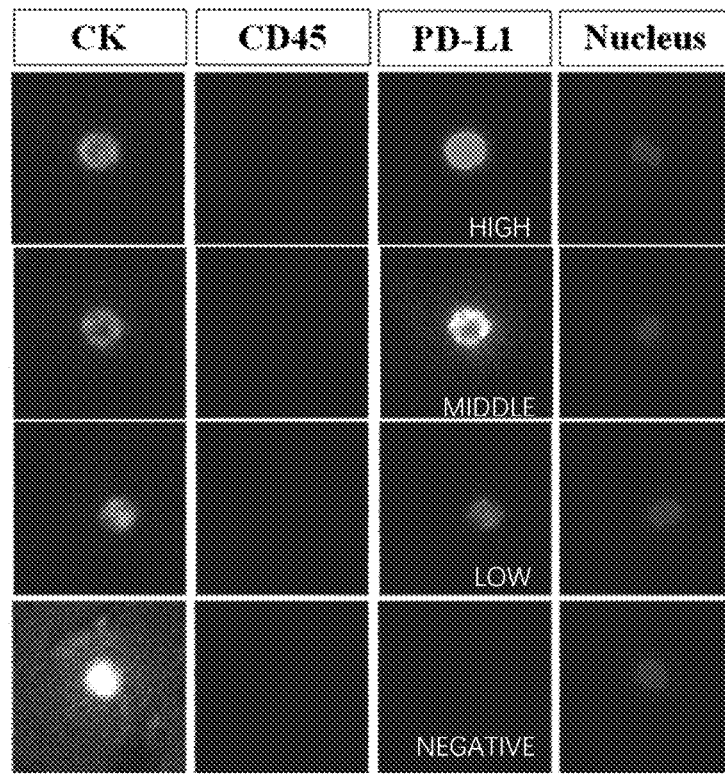
FIG. 10 shows the CTCs in the peripheral blood of liver cancer patients with different expression levels of typical PD-L1 molecules detected in test example 10.

Polypeptide Magnetic Nanoparticles Detect CTC in Peripheral Blood of Liver Cancer Patients and Perform PD-L1 Molecular Typing Took 2 mL of liver cancer patient's peripheral blood into a 15 mL centrifuge tube, added 10 μL of peptide nanomagnetic beads and mixed well, and incubated with a shaking table for 0.5-1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 10 shows the detected typical CTCs in the peripheral blood of liver cancer patients with different expression levels of PD-L1.

EXPERIMENTAL EXAMPLE 11

Figure 11:
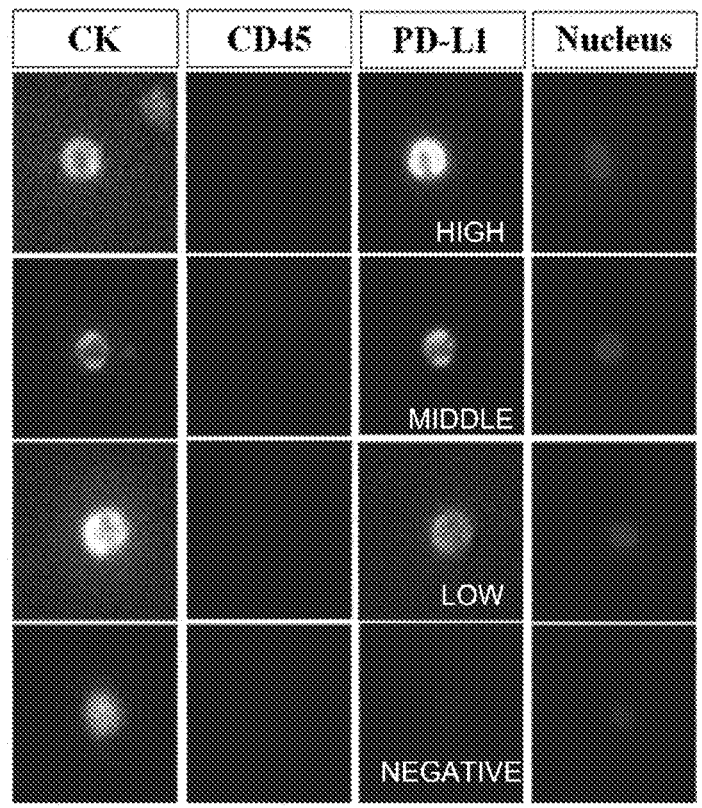
FIG. 11 shows the CTCs in the peripheral blood of cervical cancer patients with different expression levels of typical PD-L1 molecules detected in test example 11.

Polypeptide Magnetic Nanoparticles Detect CTC in Peripheral Blood of Cervical Cancer Patients and Perform PD-L1 Molecular Typing Took 2 mL of cervical cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 11 shows the detected typical CTCs in the peripheral blood of cervical cancer patients with different expression levels of PD-L1.

EXPERIMENTAL EXAMPLE 12

Figure 12:
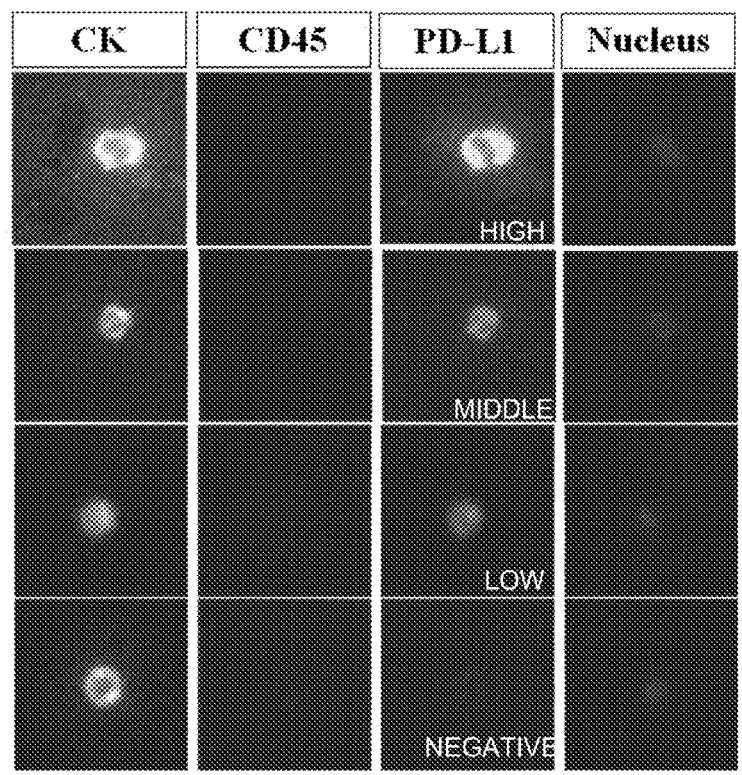
FIG. 12 shows the typical CTCs in the peripheral blood of gastric cancer patients with different expression levels of PD-L1 molecules detected in test example 12.

Polypeptide Magnetic Nanoparticles Detect CTC in Peripheral Blood of Gastric Cancer Patients and Perform PD-L1 Molecular Typing Took 2 mL of gastric cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 12 shows the detected typical CTCs in the peripheral blood of gastric cancer patients with different expression levels of PD-L1.

EXPERIMENTAL EXAMPLE 13

Figure 13:
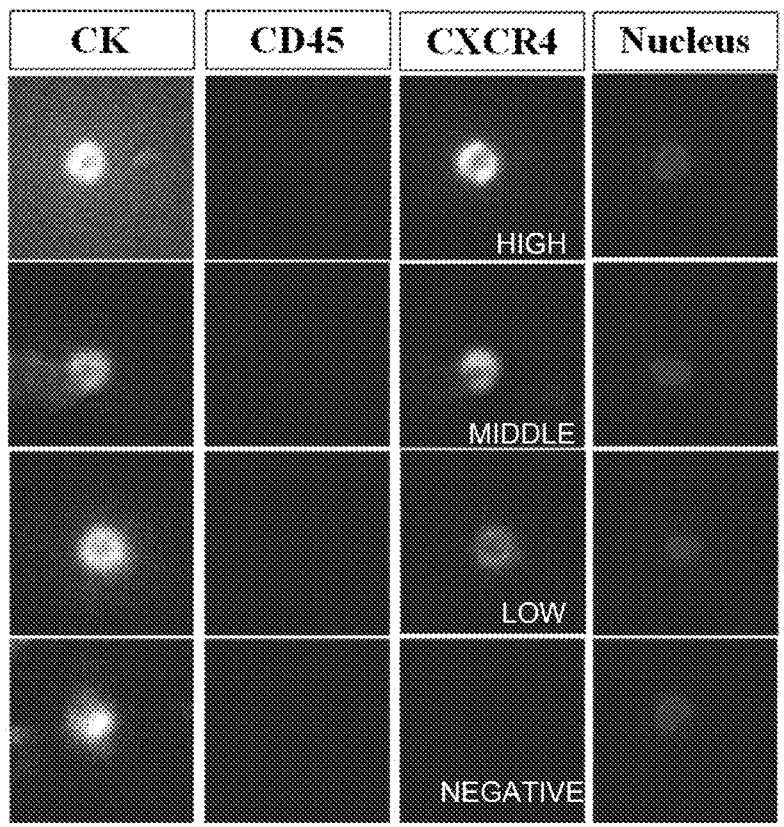
FIG. 13 shows the CTCs in the peripheral blood of breast cancer patients with different expression levels of typical CXCR4 molecules detected in test example 13.

Polypeptide Magnetic Nanoparticles Detect CTC in Peripheral Blood of Breast Cancer Patients and Perform CXCR4 Molecular Typing Took 2 mL of breast cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-CXCR4 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and CXCR4 fluorescence intensity analysis on the detected cells. In which DAPI+/CK+/CD45− and cells conforming to the cell morphology were referred to as CTCs, and DAPI+/CK+/CXCR4+/CD45− cells were referred to as CXCR4 expressing CTCs, and the CXCR4 expression level of CTCs was interpreted according to the fluorescence intensity of the PD-L1 channel. FIG. 13 shows the detected typical CTCs in the peripheral blood of breast cancer patients with different expression levels of CXCR4.

EXPERIMENTAL EXAMPLE 14

Figure 14:
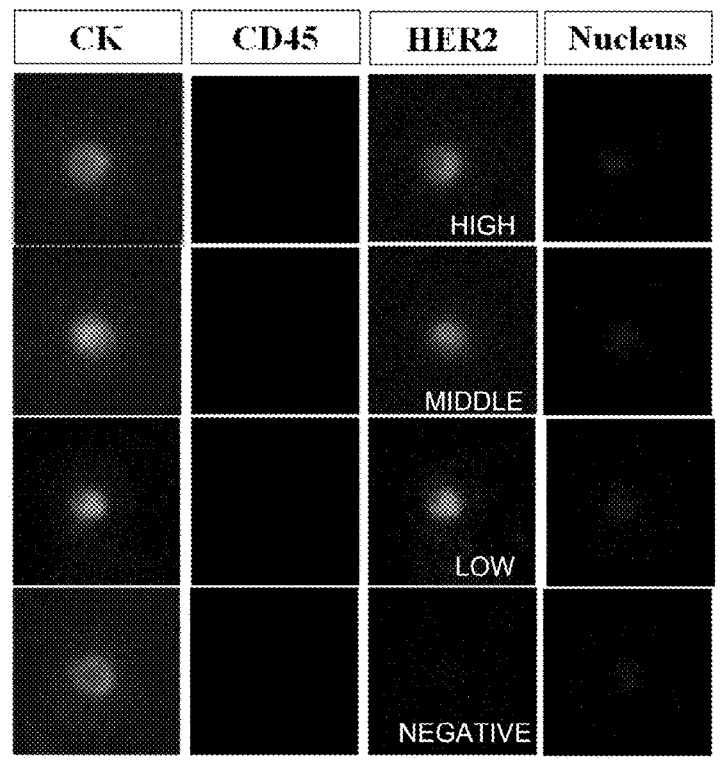
FIG. 14 shows the CTCs in the peripheral blood of gastric cancer patients with different expression levels of typical HER2 molecules detected in test example 14.

Polypeptide Magnetic Nanoparticles Detect CTC in Peripheral Blood of Gastric Cancer Patients and Perform HER2 Molecular Typing Took 2 mL of gastric cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-HER2 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and HER2 fluorescence intensity analysis on the detected cells. In which DAPI+/CK+/CD45− and cells conforming to the cell morphology were referred to as CTCs, and DAPI+/CK+/HER2+/CD45− cells were referred to as HER2 expressing CTCs, and the HER2 expression level of CTCs was interpreted according to the fluorescence intensity of the HER2 channel. FIG. 14 shows the detected typical CTCs in the peripheral blood of gastric cancer patients with different expression levels of HER2.

EXPERIMENTAL EXAMPLE 15

Figure 15:
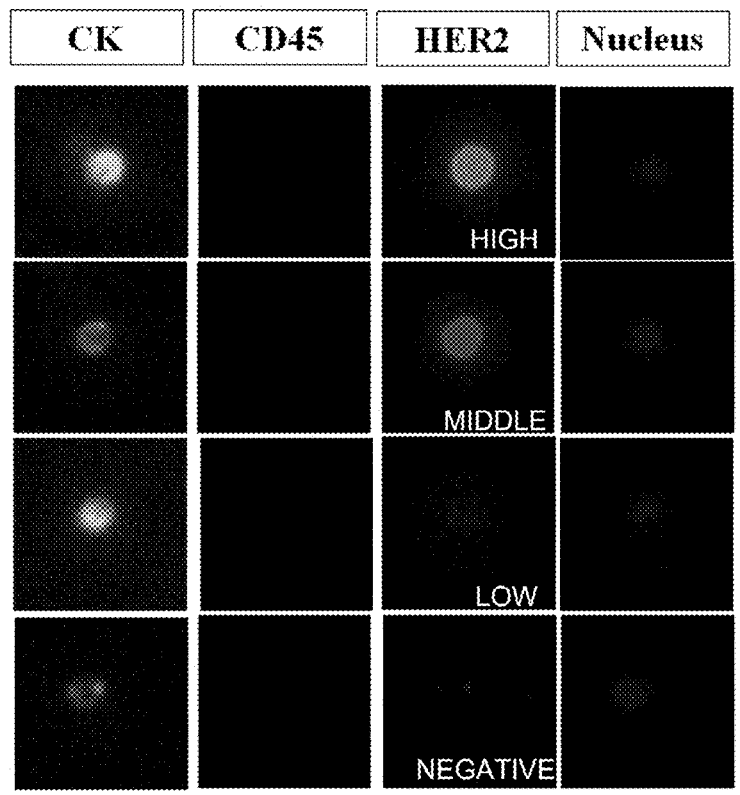
FIG. 15 shows the CTCs in the peripheral blood of colorectal cancer patients with different expression levels of typical HER2 molecules detected in test example 15.

Polypeptide Magnetic Nanoparticles Detect CTC in Peripheral Blood of Colorectal Cancer Patients and Perform HER2 Molecular Typing Took 2 mL of colorectal cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 μL immunofluorescence staining blocking solution, blocked for 30 minutes at room temperature, added 5 mL PBS for centrifugal washing. The enriched cells were respectively stained with FITC-CK, PE-CD45 and AlexaFluor647-HER2 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and HER2 fluorescence intensity analysis on the detected cells. In which DAPI+/CK+/CD45− and cells conforming to the cell morphology were referred to as CTCs, and DAPI+/CK+/HER2+/CD45− cells were referred to as HER2 expressing CTCs, and the HER2 expression level of CTCs was interpreted according to the fluorescence intensity of the HER2 channel. FIG. 15 shows the detected typical CTCs in the peripheral blood of colorectal cancer patients with different expression levels of HER2.

EXPERIMENTAL EXAMPLE 16

Figure 16:
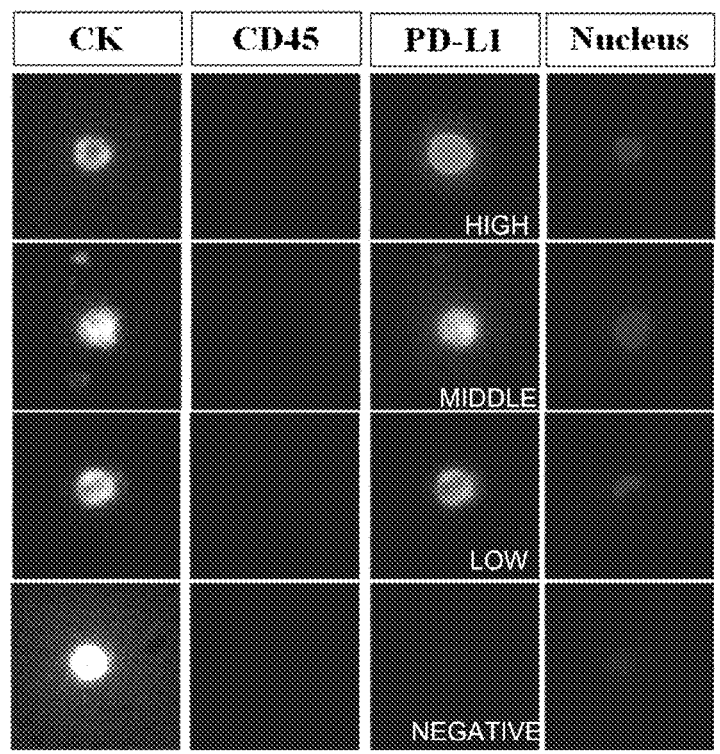
FIG. 16 shows the CTCs in the peripheral blood of colorectal cancer patients with different expression levels of typical PD-L1 molecules detected in test example 16.

Polypeptide Magnetic Nanoparticles Detect CTC in Peripheral Blood of Colorectal Cancer Patients and Perform PD-L1 Molecular Typing Took 2 mL of colorectal cancer patient's peripheral blood into a 15 mL centrifuge tube, added 10 μL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 µL immunofluorescence staining blocking solution, blocked for 30 minutes at room temperature, added 5 mL PBS for centrifugal washing. The enriched cells were respectively stained with FITC-CK, PE-CD45 and AlexaFluor647-PD-L1 (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and PD-L1 fluorescence intensity analysis on the detected cells. In which DAPI+/CK+/CD45− and cells conforming to the cell morphology were referred to as CTCs, and DAPI+/CK+/PD-L1+/CD45− cells were referred to as PD-L1 expressing CTCs, and the PD-L1 expression level of CTCs was interpreted according to the fluorescence intensity of the PD-L1 channel. FIG. 16 shows the detected typical CTCs in the peripheral blood of colorectal cancer patients with different expression levels of PD-L1.

EXPERIMENTAL EXAMPLE 17

Figure 17:
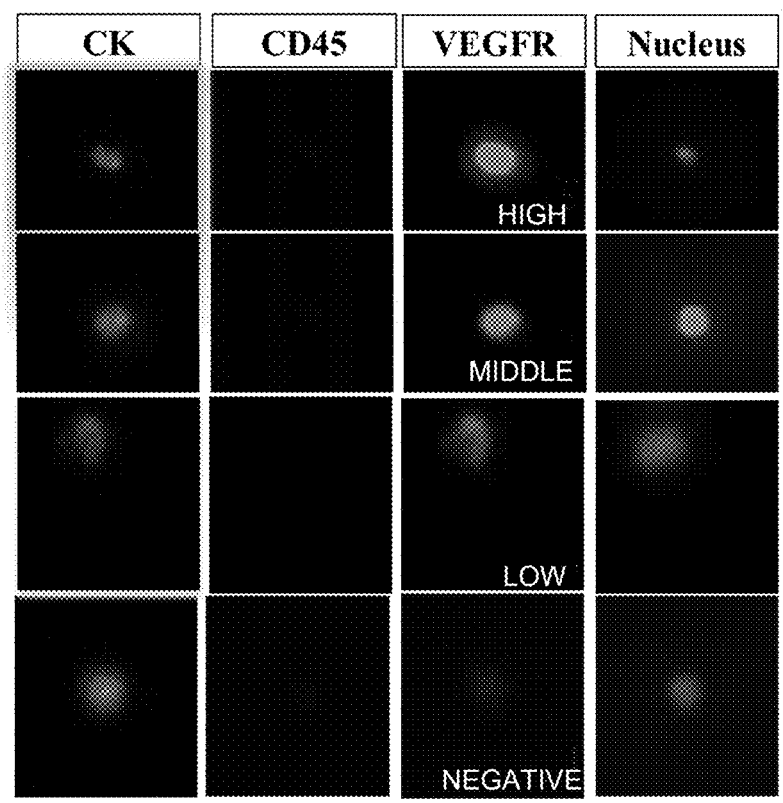
FIG. 17 shows the CTCs in the peripheral blood of colorectal cancer patients with different expression levels of typical VEGFR molecules detected in test example 17.

Polypeptide Magnetic Nanoparticles Detect CTC in Peripheral Blood of Colorectal Cancer Patients and Perform VEGFR Molecular Typing Took 2 mL of colorectal cancer patient's peripheral blood into a 15 mL centrifuge tube, added 10 µL of peptide nanomagnetic beads and mixed well, and incubated with a shaking table for 1 hour at room temperature. Removed the centrifuge tube, added 5 mL PBS and mixed gently, placed it on the magnetic stand, and then the magnetic stand was placed on a horizontal shaker for enrichment for 30 minutes. Removed the magnetic stand, discarded the supernatant, added 5 mL PBS, and placed the magnetic stand on a horizontal shaker for enrichment for 30 min. Removed the magnetic stand, discarded the supernatant, removed the centrifuge tube from the magnetic stand, blew off the magnetic beads on the tube wall with paraformaldehyde, fixed for 30 minutes at room temperature, added 5 mL PBS for centrifugal washing. Added DAPI working solution dropwise to stain the nucleus, added 5 mL PBS for centrifugal washing after nuclear staining. Added 200 µL immunofluorescence staining blocking solution, blocked for 30 minutes at room temperature, added 5 mL PBS for centrifugal washing. The enriched cells were respectively stained with FITC-CK, PE-CD45 and AlexaFluor647-VEGFR (Abcam) antibodies for 1 hour. Added 5 mL PBS centrifuge and wash the mount, observed and found the cell interface under 20 times objective lens, set the corresponding exposure time of each fluorescence channel of DAPI, FITC, PE and Alexa Fluor 647, performed fluorescence scanning on the sample area, and performed CTC identification and VEGFR fluorescence intensity analysis on the detected cells. In which DAPI+/CK+/CD45− and cells conforming to the cell morphology were referred to as CTCs, and DAPI+/CK+/VEGFR+/CD45− cells were referred to as VEGFR expressing CTCs, and the VEGFR expression level of CTCs was interpreted according to the fluorescence intensity of the VEGFR channel. FIG. 17 shows the detected typical CTCs in the peripheral blood of colorectal cancer patients with different expression levels of VEGFR.

Although the present invention has been described to a certain extent, it is obvious that various conditions can be appropriately changed without departing from the spirit and scope of the present invention. It can be understood that the present invention is not limited to the embodiments, but belongs to the scope of the claims, which includes equivalent substitutions of each of the factors.

The invention claimed is:

1. A magnetic nanoparticle comprising a specific targeting polypeptide, wherein the specific targeting polypeptide is a specific recognition polypeptide targeting an epithelial cell adhesion molecule, wherein the specific targeting polypeptide comprises an amino acid sequence as set forth in any one of SEQ ID NO:1-9.

2. The magnetic nanoparticle comprising a specific targeting polypeptide according to claim 1, wherein the magnetic nanoparticle further comprises streptavidin.

3. A preparation method of the magnetic nanoparticle comprising a specific targeting polypeptide according to claim 1, wherein the method comprises the following steps:
   (1) preparing a polypeptide solution comprising the specific targeting polypeptide and a magnetic nanoparticle solution comprising the magnetic nanoparticle; and
   (2) mixing and reacting the polypeptide and the magnetic nanoparticle solutions prepared in step (1) to obtain the magnetic nanoparticle comprising a specific targeting polypeptide.

4. The method according to claim 3, wherein in the step (1), a solvent for preparing the polypeptide solution is one or more selected from the following: water, physiological saline, PBS, HEPES; and/or a solvent for preparing the magnetic nanoparticle solution is one or more selected from the following: water, PBS, and HEPES.

5. The method according to claim 3, wherein in the step (1), a final concentration of the specific targeting polypeptide in the polypeptide solution is 1-1000 pg/mL; and/or a final concentration of the magnetic nanoparticle in the magnetic nanoparticle solution is 1-10000 pg/mL.

6. The method according to claim 3, wherein in the step (2), the mass ratio of the specific targeting polypeptide and the magnetic nanoparticle is 1:10-5:1.

7. The magnetic nanoparticle comprising a specific targeting polypeptide according to claim 2, wherein a particle size of the magnetic nanoparticle is 100-900 nm.

8. The magnetic nanoparticle comprising a specific targeting polypeptide according to claim 1, wherein the amino acid sequence is SEQ ID NO: 1.

* * * * *

SEQUENCE LISTING

```
<160> NUMBER OF SEQ ID NOS: 22

<210> SEQ ID NO 1
<211> LENGTH: 26
<212> TYPE: PRT
<213> ORGANISM: Artificial Sequence
<220> FEATURE:
<223> OTHER INFORMATION: synthetic construct; targeting peptide

<400> SEQUENCE: 1

Val Arg Arg Asp Ala Pro Arg Phe Ser Met Gln Gly Leu Asp Ala Cys
1               5                   10                  15

Gly Gly Asn Asn Cys Asn Asn Asn Asn Asn
            20                  25

<210> SEQ ID NO 2
<211> LENGTH: 25
<212> TYPE: PRT
<213> ORGANISM: Artificial Sequence
<220> FEATURE:
<223> OTHER INFORMATION: synthetic construct; targeting peptide
```

-continued

<400> SEQUENCE: 2

Val Arg Arg Asp Ala Pro Arg Phe Ser Met Gln Gly Leu Asp Ala Cys
1               5                   10                  15

Gly Gly Asn Asn Cys Asn Asn Asn Asn
            20                  25

<210> SEQ ID NO 3
<211> LENGTH: 24
<212> TYPE: PRT
<213> ORGANISM: Artificial Sequence
<220> FEATURE:
<223> OTHER INFORMATION: synthetic construct; targeting peptide

<400> SEQUENCE: 3

Val Arg Arg Asp Ala Pro Arg Phe Ser Met Gln Gly Leu Asp Ala Cys
1               5                   10                  15

Gly Gly Asn Asn Cys Asn Asn Asn
            20

<210> SEQ ID NO 4
<211> LENGTH: 25
<212> TYPE: PRT
<213> ORGANISM: Artificial Sequence
<220> FEATURE:
<223> OTHER INFORMATION: synthetic construct; targeting peptide

<400> SEQUENCE: 4

Val Arg Arg Asp Ala Pro Arg Phe Ser Met Gln Gly Leu Asp Ala Cys
1               5                   10                  15

Gly Gly Cys Asn Asn Asn Asn Asn Asn
            20                  25

<210> SEQ ID NO 5
<211> LENGTH: 24
<212> TYPE: PRT
<213> ORGANISM: Artificial Sequence
<220> FEATURE:
<223> OTHER INFORMATION: synthetic construct; targeting peptide

<400> SEQUENCE: 5

Val Arg Arg Asp Ala Pro Arg Phe Ser Met Gln Gly Leu Asp Ala Cys
1               5                   10                  15

Gly Gly Cys Asn Asn Asn Asn Asn
            20

<210> SEQ ID NO 6
<211> LENGTH: 23
<212> TYPE: PRT
<213> ORGANISM: Artificial Sequence
<220> FEATURE:
<223> OTHER INFORMATION: synthetic construct; targeting peptide

<400> SEQUENCE: 6

Val Arg Arg Asp Ala Pro Arg Phe Ser Met Gln Gly Leu Asp Ala Cys
1               5                   10                  15

Gly Gly Cys Asn Asn Asn Asn
            20

<210> SEQ ID NO 7
<211> LENGTH: 25
<212> TYPE: PRT
<213> ORGANISM: Artificial Sequence
<220> FEATURE:
<223> OTHER INFORMATION: synthetic construct; targeting peptide

```
<400> SEQUENCE: 7

Val Arg Arg Asp Ala Pro Arg Phe Ser Met Gln Gly Leu Asp Ala Gly
1               5                   10                  15

Gly Cys Asn Asn Cys Asn Asn Asn Asn
            20                  25

<210> SEQ ID NO 8
<211> LENGTH: 24
<212> TYPE: PRT
<213> ORGANISM: Artificial Sequence
<220> FEATURE:
<223> OTHER INFORMATION: synthetic construct; targeting peptide

<400> SEQUENCE: 8

Val Arg Arg Asp Ala Pro Arg Phe Ser Met Gln Gly Leu Asp Ala Gly
1               5                   10                  15

Gly Cys Asn Asn Cys Asn Asn Asn
            20

<210> SEQ ID NO 9
<211> LENGTH: 23
<212> TYPE: PRT
<213> ORGANISM: Artificial Sequence
<220> FEATURE:
<223> OTHER INFORMATION: synthetic construct; targeting peptide

<400> SEQUENCE: 9

Val Arg Arg Asp Ala Pro Arg Phe Ser Met Gln Gly Leu Asp Ala Gly
1               5                   10                  15

Gly Cys Asn Asn Cys Asn Asn
            20

<210> SEQ ID NO 10
<211> LENGTH: 35
<212> TYPE: PRT
<213> ORGANISM: Artificial Sequence
<220> FEATURE:
<223> OTHER INFORMATION: synthetic construct; targeting peptide
<220> FEATURE:
<221> NAME/KEY: MISC
<222> LOCATION: (16)..(35)
<223> OTHER INFORMATION: Xaa can be any amino acid, preferably C, G, N
<220> FEATURE:
<221> NAME/KEY: MISC
<222> LOCATION: (21)..(35)
<223> OTHER INFORMATION: Xaa can be present or absent

<400> SEQUENCE: 10

Val Arg Arg Asp Ala Pro Arg Phe Ser Met Gln Gly Leu Asp Ala Xaa
1               5                   10                  15

Xaa Xaa Xaa Xaa Xaa Xaa Xaa Xaa Xaa Xaa Xaa Xaa Xaa Xaa Xaa
            20                  25                  30

Xaa Xaa Xaa
        35

<210> SEQ ID NO 11
<211> LENGTH: 6
<212> TYPE: PRT
<213> ORGANISM: Artificial Sequence
<220> FEATURE:
<223> OTHER INFORMATION: synthetic construct; targeting peptide

<400> SEQUENCE: 11

Cys Gly Gly Asn Cys Cys
```

```
1               5

<210> SEQ ID NO 12
<211> LENGTH: 6
<212> TYPE: PRT
<213> ORGANISM: Artificial Sequence
<220> FEATURE:
<223> OTHER INFORMATION: synthetic construct; targeting peptide

<400> SEQUENCE: 12

Cys Gly Gly Asn Cys Asn
1               5

<210> SEQ ID NO 13
<211> LENGTH: 6
<212> TYPE: PRT
<213> ORGANISM: Artificial Sequence
<220> FEATURE:
<223> OTHER INFORMATION: synthetic construct; targeting peptide

<400> SEQUENCE: 13

Cys Gly Gly Asn Asn Cys
1               5

<210> SEQ ID NO 14
<211> LENGTH: 6
<212> TYPE: PRT
<213> ORGANISM: Artificial Sequence
<220> FEATURE:
<223> OTHER INFORMATION: synthetic construct; targeting peptide

<400> SEQUENCE: 14

Cys Gly Gly Asn Asn Asn
1               5

<210> SEQ ID NO 15
<211> LENGTH: 7
<212> TYPE: PRT
<213> ORGANISM: Artificial Sequence
<220> FEATURE:
<223> OTHER INFORMATION: synthetic construct; targeting peptide

<400> SEQUENCE: 15

Cys Gly Gly Asn Cys Cys Asn
1               5

<210> SEQ ID NO 16
<211> LENGTH: 8
<212> TYPE: PRT
<213> ORGANISM: Artificial Sequence
<220> FEATURE:
<223> OTHER INFORMATION: synthetic construct; targeting peptide

<400> SEQUENCE: 16

Cys Gly Gly Asn Cys Cys Asn Asn
1               5

<210> SEQ ID NO 17
<211> LENGTH: 7
<212> TYPE: PRT
<213> ORGANISM: Artificial Sequence
<220> FEATURE:
<223> OTHER INFORMATION: synthetic construct; targeting peptide

<400> SEQUENCE: 17

Cys Gly Gly Asn Cys Asn Asn
1               5
```

```
<210> SEQ ID NO 18
<211> LENGTH: 8
<212> TYPE: PRT
<213> ORGANISM: Artificial Sequence
<220> FEATURE:
<223> OTHER INFORMATION: synthetic construct; targeting peptide

<400> SEQUENCE: 18

Cys Gly Gly Asn Cys Asn Asn Asn
1               5

<210> SEQ ID NO 19
<211> LENGTH: 7
<212> TYPE: PRT
<213> ORGANISM: Artificial Sequence
<220> FEATURE:
<223> OTHER INFORMATION: synthetic construct; targeting peptide

<400> SEQUENCE: 19

Cys Gly Gly Asn Asn Cys Asn
1               5

<210> SEQ ID NO 20
<211> LENGTH: 8
<212> TYPE: PRT
<213> ORGANISM: Artificial Sequence
<220> FEATURE:
<223> OTHER INFORMATION: synthetic construct; targeting peptide

<400> SEQUENCE: 20

Cys Gly Gly Asn Asn Cys Asn Asn
1               5

<210> SEQ ID NO 21
<211> LENGTH: 7
<212> TYPE: PRT
<213> ORGANISM: Artificial Sequence
<220> FEATURE:
<223> OTHER INFORMATION: synthetic construct; targeting peptide

<400> SEQUENCE: 21

Cys Gly Gly Asn Asn Asn Asn
1               5

<210> SEQ ID NO 22
<211> LENGTH: 8
<212> TYPE: PRT
<213> ORGANISM: Artificial Sequence
<220> FEATURE:
<223> OTHER INFORMATION: synthetic construct; targeting peptide

<400> SEQUENCE: 22

Cys Gly Gly Asn Asn Asn Asn Asn
1               5
```